(12) United States Patent
Axnix et al.

(10) Patent No.: US 8,775,787 B2
(45) Date of Patent: Jul. 8, 2014

(54) METHOD AND DEVICE FOR CONFIGURING FUNCTIONAL CAPABILITIES IN A DATA PROCESSING SYSTEM

(75) Inventors: Christine Axnix, Steinenbronn (DE); John R. Birtles, Staatsburg, NY (US); Juergen Probst, Wildberg (DE)

(73) Assignee: International Business Machines Corporation, Armonk, NY (US)

( * ) Notice: Subject to any disclaimer, the term of this patent is extended or adjusted under 35 U.S.C. 154(b) by 788 days.

(21) Appl. No.: 12/353,467

(22) Filed: Jan. 14, 2009

(65) Prior Publication Data

US 2009/0187751 A1  Jul. 23, 2009

(30) Foreign Application Priority Data

Jan. 23, 2008  (EP) .................................... 08150527

(51) Int. Cl.
*G06F 1/24* (2006.01)
*G06F 9/46* (2006.01)
*G06F 15/177* (2006.01)

(52) U.S. Cl.
USPC ............ 713/100; 718/104; 709/221; 709/226

(58) Field of Classification Search
USPC ................. 713/1, 100; 718/104; 709/221, 226
See application file for complete search history.

(56) References Cited

U.S. PATENT DOCUMENTS

| | | | | |
|---|---|---|---|---|
| 5,333,273 A * | 7/1994 | Raasch et al. | ................... | 710/67 |
| 5,982,899 A * | 11/1999 | Probst | ............... | 713/1 |
| 7,194,616 B2 * | 3/2007 | Axnix et al. | .................. | 713/100 |
| 2003/0120914 A1 * | 6/2003 | Axnix et al. | .................. | 713/100 |
| 2006/0218277 A1 * | 9/2006 | Birkestrand | ................. | 709/226 |
| 2008/0082983 A1 * | 4/2008 | Groetzner et al. | ............ | 718/105 |

* cited by examiner

*Primary Examiner* — Chun Cao
(74) *Attorney, Agent, or Firm* — William A. Kinnaman, Jr.

(57) ABSTRACT

A method and device for configuring functional capabilities in a data processing system. Configuration data comprises permanent entitlement data specifying permanent functional capabilities of the data processing system and temporary entitlement data, generated from temporary entitlement records received by the data processing system, specifying temporary functional capabilities of the data processing system. When storing temporary entitlement data, an activation level record specifying a number of resources of the data processing system used for temporarily implementing functional capabilities according to the temporary entitlement data is generated and stored. Responsive to a request to activate or deactivate temporary capacity for the data processing system, for every activation level record, the number of resources specified by the activation level records is modified such that the overall sum of resources specified by the activation level records does not change, and the resources are activated as specified by the activation level records.

20 Claims, 11 Drawing Sheets

METHOD AND DEVICE FOR CONFIGURING FUNCTIONAL CAPABILITIES IN A DATA PROCESSING SYSTEM

BACKGROUND OF THE INVENTION

The present invention relates to the configuration of functional capabilities in a data processing system.

An important feature of computer systems is the ability to adjust the provided processing and memory capacity depending on workload requirements, or to provide backup capacity for disaster recovery situations. Modern computer systems such as the IBM System z provide the capability to activate and deactivate additional processing capacity concurrently to normal system operation—i.e. the computer system does not have to be shut down or an operating system restarted to make use of the changed configuration. On Demand processor and memory capacity needs more physical capacity installed than enabled on computer systems. As long as there is dormant physical capacity available such capacity can be activated as the customer need demands. Additional processing capacity can be implemented using temporary processing resources that can be activated and deactivated as required on top of a permanent base configuration.

To prevent unauthorized activation of dormant capacity the activation is usually protected by a control system utilizing encryption as well as further secure methods binding the entitlement data to a specific machine. For example, patent U.S. Pat. No. 5,982,899 describes a method utilizing an unchangeable unique identifier that may be located within an integrated circuit chip. Temporary resource activation can be under control of an encrypted certificate using this unchangeable unique identifier. The Capacity on Demand features of IBM System z are described in U.S. Pat. No. 7,194,616 and J. Probst et al. "Flexible configuration and concurrent upgrade for the IBM eServer z900", IBM J. Res. & Dev., Vol. 46, No 4/5, July/September 2002, pp. 551-558. One major restriction of IBM's Capacity on Demand offerings is that each new temporary capacity offering requires additional firmware support. Also, the temporary capacity offerings are restricted in the number of times they could be activated.

Further, only one temporary capacity offering can be active in a computer system at a time. After permanent model conversions, a temporary capacity record has to be exchanged because it may be no longer usable on top of the new permanent configuration for a number of reasons. Because temporary records become unusable when the permanent configuration changes, they can not stay active during the application of the permanent upgrade. That is, temporary capacity has to be removed prior to the permanent model change, resulting in performance impact for the customer.

SUMMARY OF THE INVENTION

It is therefore an object of the present invention to provide a method and a device for configuring functional capabilities in a data processing system that is improved over the prior art, and a corresponding computer program and computer program product, and a corresponding data processing system.

This object is achieved by the invention as defined in the independent claims. Further advantageous embodiments of the present invention are defined in the dependant claims.

The advantages of the present invention are achieved by a method for configuring functional capabilities in a data processing system comprising a first non-volatile storage for configuration data, said configuration data comprising permanent entitlement data specifying permanent and temporary entitlement data specifying temporary functional capabilities of said data processing system, wherein said temporary entitlement data is generated from temporary entitlement records received by said data processing system, the method comprising the steps of:

a) when storing temporary entitlement data in said first non-volatile storage, generating an activation level record comprising the number of resources of said data processing system used for temporarily implementing functional capabilities according to the temporary entitlement data and storing the activation level record in a second non-volatile storage;

b) when receiving a request to activate or deactivate temporary capacity for said data processing system, for every activation level record:

b1) modifying the number of resources specified by all activation level records such that the overall sum of resources specified by all activation level records does not change;

b2) activating all resources as specified by all activation level records.

In a preferred embodiment of the invention, step b1) further comprises the steps of:

b1a) determining if sufficient free resources are available to satisfy the specified number of resources in the activation level record;

b1b) if not enough free resources are available, compensating this by reducing the number of resources of activation level records.

The advantages of the invention are also achieved by a device for configuring functional capabilities in a data processing system comprising a first non-volatile storage for configuration data, said configuration data comprising permanent entitlement data specifying permanent and temporary entitlement data specifying temporary functional capabilities of said data processing system, wherein said temporary entitlement data is generated from temporary entitlement records received by said data processing system, the device comprising:

generation means responsive to means storing temporary entitlement data in said first non-volatile storage, said generation means generating an activation level record comprising the number of resources of said data processing system used for temporarily implementing functional capabilities according to the temporary entitlement data and storing the activation level record in a second non-volatile storage;

selection means responsive to receiving a request to activate or deactivate temporary capacity for said data processing system, said selection means using for every activation level record:

modification means modifying the number of resources specified by all activation level records such that the overall sum of resources specified by all activation level records does not change;

activation means responsive to said modification means, said activation means activating all resources as specified by all activation level records.

The invention uses a temporary entitlement record, which contains a set of rules that can be combined in any order. These rules can be grouped in resource and time limits and token pools. They can specify entitlement rules and also specify which back-end processes need to be kicked off by the computer system firmware. An offering signature tells which rules are in effect and need to be enforced by the computer system. Temporary entitlement records can also contain general control flags that are understood by the computer system.

A computer system comprising a device according to the invention understands all rules and enforces the specified limits by doing entitlement checking upfront and backend processing after activation of the resources as required. No terms and conditions are hard coded in the computer system firmware or specified by manual back-end processing or human intervention any more. The order system of the computer system manufacturer or even the computer system user can select the set of rules that are in effect for any given offering.

It is possible to manage and activate multiple temporary entitlement records at the same time, independently of each other. This is accomplished by maintaining multiple control structures to hold the temporary entitlement records, their corresponding activation levels, a list of valid activation choices, and expiration timers.

All temporary entitlement records operate on the same physical resource pool. The invention allows detecting and resolving conflicts in case not enough physical resources are available to fulfill all requests. Normally, an activation request is rejected if it can not be fully satisfied due to an insufficient amount of physical hardware resources or due to a target configuration which is not within the model structure of the computer system supported by the manufacturer and/or seller, and a retry mechanism is provided for the computer system user to retry with less requested resources.

For ease of use, in one embodiment of the invention, computer system user guidance is provided as to what the activation possibilities for any given record are. This information is provided in form of a valid movements list, which contains the valid choices for activations and deactivations. This requires means to determine the list of possible activations for each temporary entitlement record, which is restricted by the certificate limits of the temporary entitlement record and by other temporary capacity active at any given time.

For emergency situations where a retry is not appropriate, an option to force temporary capacity activation even if not enough resources are available can be provided in an embodiment of the invention, which includes automatic re-activation of pending resources as soon as more physical resources become available. In the preferred embodiment of this invention, this is accomplished by reducing the activation levels of the forced temporary capacity activation to a number which can be contained by the physical hardware configuration of the computer system, and maintaining the number of pending resources. If spare resources become available in the computer system, e.g. by deactivating resources belonging to another activation level, by changing the permanent system configuration, or by adding physical hardware components such as additional processor books, the activation levels of the forced activation are increased by the number of pending resources and those pending resources are automatically activated.

In case when multiple temporary entitlement records are active at the same time, the invention allows to optimize the activation levels (which are associated to the requested resources) for each temporary entitlement record and automatically shifting activation levels from one temporary entitlement record to another in order to achieve the best possible cost structure for both the computer system user and the computer system manufacturer and/or seller, independent of the order in which the temporary entitlement records are activated. This is accomplished by assigning a separate activation level structure to each of the currently installed temporary entitlement records (offerings). These activation level structures reflect the amount of temporary resources that are active on behalf of this temporary entitlement record, and the amount of resources that the computer system user of this temporary entitlement record will be accounted for.

After each activation or deactivation of temporary capacity, the computer system evaluates all activation levels of all temporary capacity records, and determines whether it should shift accountable resources from the activation level of one temporary entitlement record to the activation level of another temporary entitlement record. This is performed by subtracting the appropriate amount of resources from the activation level of the temporary entitlement record and adding the same amount of resources to the activation level of the other temporary entitlement record. Therefore, the overall sum of active resources stays the same; just the distribution of these resources across records is shifted.

If, for example, resources from a pay-per-use temporary entitlement record are currently active, and then an insurance model (flat rate usage, independent of number of resources active on behalf of this temporary entitlement record) temporary entitlement record is activated, the computer system may decide to subtract some resources from the pay-per-use temporary entitlement record and add them to activation levels of the insurance type entitlement record.

With respect to permanent model conversions, the computer system can optimize the distribution across permanent and temporary activation levels and convert temporary activation levels into a permanent configuration.

If, for example, pay-per-use temporary capacity is active which has been used for workload peaks, and the computer system user decides to purchase this peak workload capacity permanently, the computer system reduces the activation levels of the pay-per-use temporary capacity record by the amount of additionally purchased permanent capacity.

Similar optimization rules may be applied to manage the distribution of active computer system processors across the temporary entitlement records according to the computer system workload or environmental conditions (e.g., power consumption, temperature).

In one embodiment, the invention provides a new approach to limit the temporary capacity entitlement. State of the art computer systems use fixed processor counts or capacity settings for the target configuration. The invention allows specifying a range of target configurations that is automatically adjusted when the permanent configuration changes.

In one embodiment of the invention the temporary capacity entitlements can be limited and any portion of a temporary entitlement record can be activated. The computer system user decides at activation time how he wants to configure the offering, i.e. which portion of his entitlement as defined in the certificate (the temporary entitlement record) he is going to use. Previously, his only choice was to activate all or nothing. The list of valid movements guides the computer user to what his activation choices are for each installed temporary entitlement record.

Therefore, there is no need to replace the temporary capacity entitlements after a permanent model change of the computer system, which means that temporary capacity can stay active during permanent model changes. This in turn allows to seamlessly converting temporary resources (e.g. pay-per-use resources) to permanent capacity which means that the charges for using temporary capacity automatically stop after these resources are converted to permanent. Again here, the computer system automatically adjusts the temporary capacity activation levels to achieve the best possible overall cost structure.

In prior art solutions, the temporary capacity resources have to be deactivated first before the additional permanent capacity resources can be activated, which always results in a performance impact for the computer system user.

In one embodiment of the invention, the asset protection of the usable temporary capacity data and the activation/deactivation history data is used. Activation/deactivation timestamps, billing information, and control data for residual tokens are stored by the computer system in a secure storage and protected via cryptographic techniques, e.g. via TDES (Triple Data Encryption Algorithm). The computer system needs the ability to decrypt this data during initial load time to ensure integrity of this data, and to encrypt this data again each time it is modified. The billing system needs the ability to decrypt the history data to ensure its integrity. Symmetric keys can be used. The symmetric key (e.g. the TDES key) could be generated by the computer system manufacturer or seller and securely transported to the computer system in an RSA (Rivest Shamir Adleman) encrypted temporary entitlement record. This ensures that the key can not be modified on the computer system. The same key is transported to the billing system on a secure path to ensure integrity of the history data used for billing.

The temporary entitlement records can be refilled. Refill of capacity token pools is a known concept. Increasing the resource limits for temporary records while the corresponding resources are active (e.g. increasing the max number of resources that can be activated on behalf of this temporary entitlement record) is known from the IBM System z On/Off Capacity On Demand, but the invention allows a time limit replenishment while a temporary entitlement record is active. This provides the ability to extend the activation time of a temporary entitlement record while it is active, thus eliminating the risk for expiration and potentially forcing deactivation and removal of temporary resources by the computer system after the temporary entitlement record expires.

The invention allows introducing a flexible entitlement structure suitable for all types of computer system offerings, which contain a set of entitlement and back-end processing rules that can be combined in any order and combination to specify the needed terms and conditions in the temporary entitlement record.

BRIEF DESCRIPTION OF THE DRAWINGS

The present invention and its advantages are now described in conjunction with the accompanying drawings.

DETAILED DESCRIPTION OF THE INVENTION

Introduction

A state of the art computer system may be comprised of multiple processor books each of them providing processor and memory resources. The amount of resources may be identical or differ between the multiple processor books. All those resources may be combined to a single SMP (Symmetrical Multi Processor) system such that it does not matter how the enabled capacity is allocated from the physical capacity provided by multiple processor books, i.e. the entitlement for permanent and for temporary capacity is specified and charged at the system level.

Figure 1:
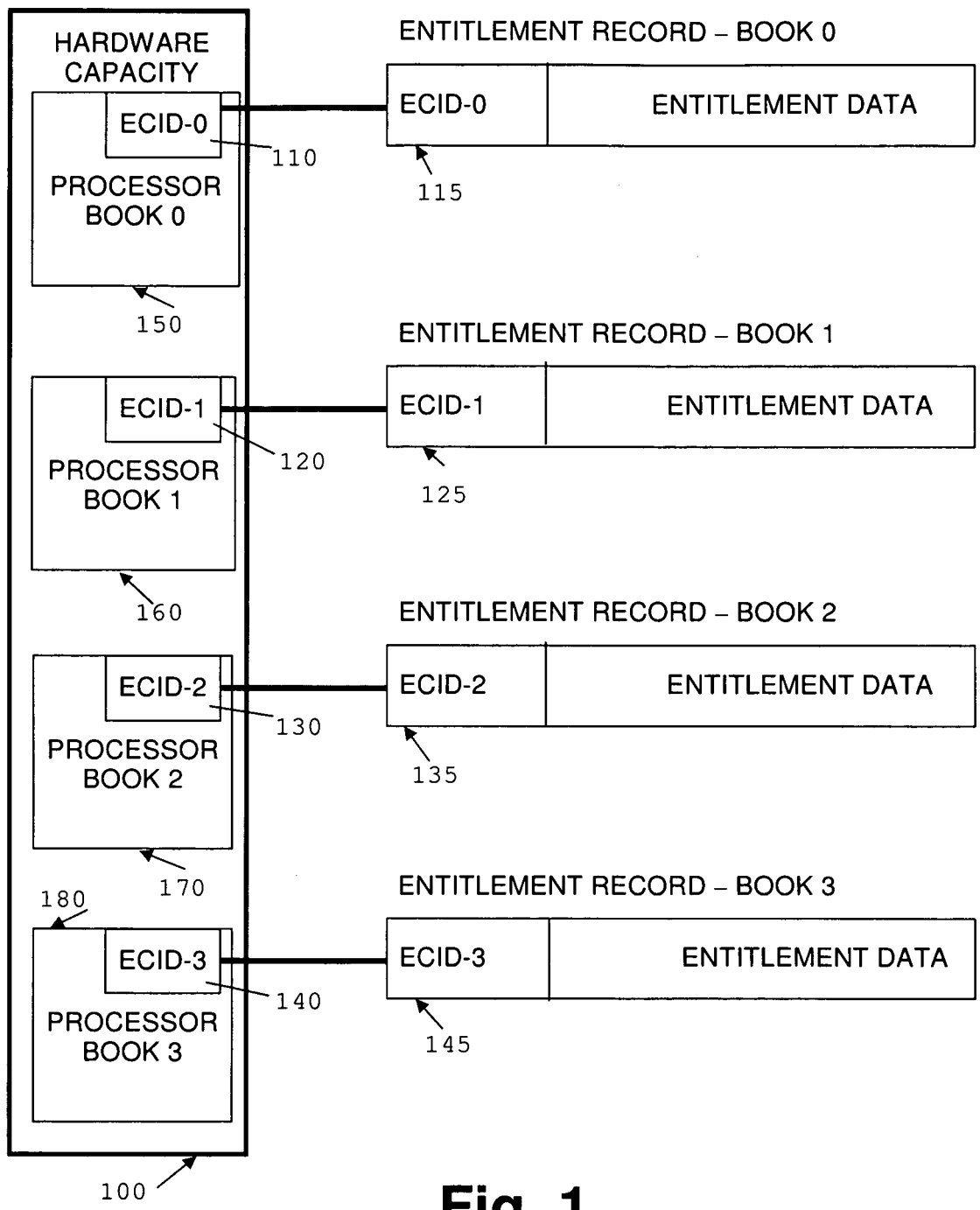
FIG. 1: Is a block diagram of a subsystem of a computer system.

The example implementation of a hardware capacity 100 of a computer system shown in FIG. 1 utilizes the unchangeable identifiers (ECID: Engineering Change IDentifier) 110, 120, 130, 140 of each single processor book 150, 160, 170, 180 to bind the entitlements for the physical resources of the corresponding processor books to their hardware implementation and prevent usage of the entitlement data contained in the associated entitlement records 115, 125, 135, 145 for other processor books residing in the same computer system or in a different computer system. Therefore, there is a one to one relationship between a particular processor book and the associated entitlement record.

There is one major disadvantage with this approach: Sometimes processor books need to be exchanged for repair or upgrade purposes. When a processor book is being exchanged carrying the ECID for the encrypted entitlement record this record also must be exchanged to match the ECID of the replacing book and a new entitlement record with the appropriate processor and memory definitions must be created and loaded into the machine. Since the data is machine configuration specific it cannot be stored as a generic record but must be created for example on-line utilizing the current authorization definition of the failing processor book. This needs on-line access to the critical asset protection system. Also the certificate of tokens concept described in IPCOM000139433D does not solve this problem.

Figure 2:
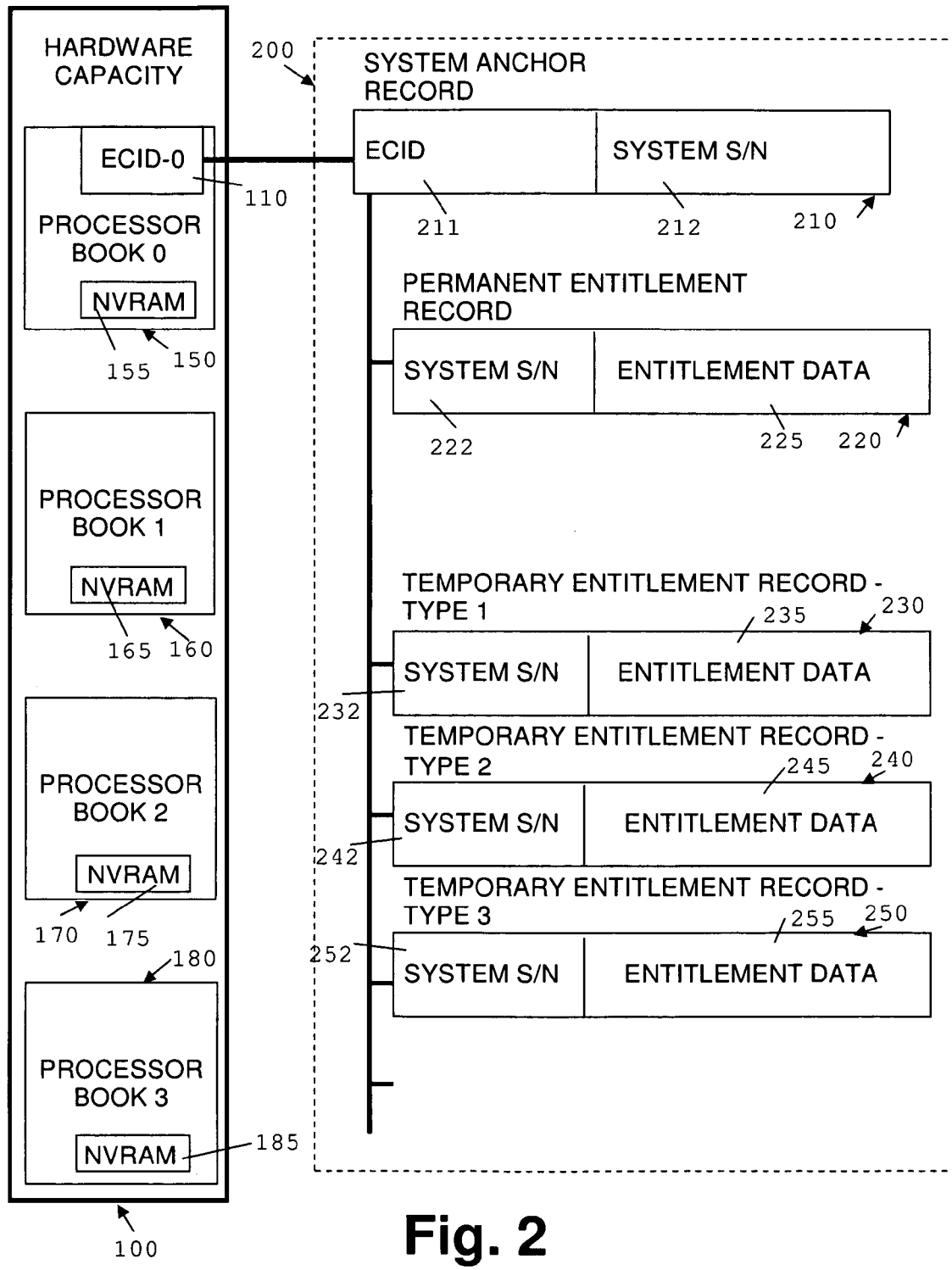
FIG. 2: Is a block diagram of a subsystem of a computer system suitable for the invention.

FIG. 2 shows the hardware capacity 100 of FIG. 1. The processor books 150, 160, 170, 180 contain non-volatile memory 155, 165, 175, 185 respectively, e.g. implemented by NVRAM (Non-volatile Random Access Memory) or flash memory. The content 200 of the non-volatile memory 155 of processor book 150 comprises a System Anchor record 210 and permanent and temporary entitlement records, e.g. the permanent entitlement record 220 and the temporary entitlement records 230, 240, 250 as shown. The System Anchor record 210 contains an ECID 211 and a system unique ID 212. An example for a system unique ID 212 could be the system serial number (S/N), which is assigned by the manufacturer of the computer system. The ECID 211 is unique and as being part of a chip it is unchangeable and cannot be cloned as long as the chip cannot be cloned by third party. The System Anchor record 210 links to the ECID 110 of the processor book 150 and is encrypted, e.g. via the asymmetric RSA (Rivest Shamir Adleman) cryptosystem. The System Anchor record 210 may be generated as suggested by U.S. Pat. No. 5,982,899. In that case, the System Anchor record 210 cannot be changed and it cannot be generated with a different system unique ID since the RSA private key is unknown to unauthorized people.

Entitlement records 220, 230, 240, 250 are linked to the System Anchor record 210 using the system unique ID 212 as linkage. Any number and type of entitlement records can be linked to the System Anchor record 210. The entitlement records 220, 230, 240, 250 are also encrypted and thus cannot be changed or generated without authorization. The entitlement records 220, 230, 240, 250 contain a unique identifier and specify resources at the system level and thus the total of resources is easy to calculate. The unique identifiers 222, 232, 242, 252 must be equal to the system unique identifier 212. The resources are specified by the entitlement records 220, 230, 240, 250 by their entitlement data 225, 235, 245, 255 respectively.

Generation of a System Anchor Record

Figure 3:
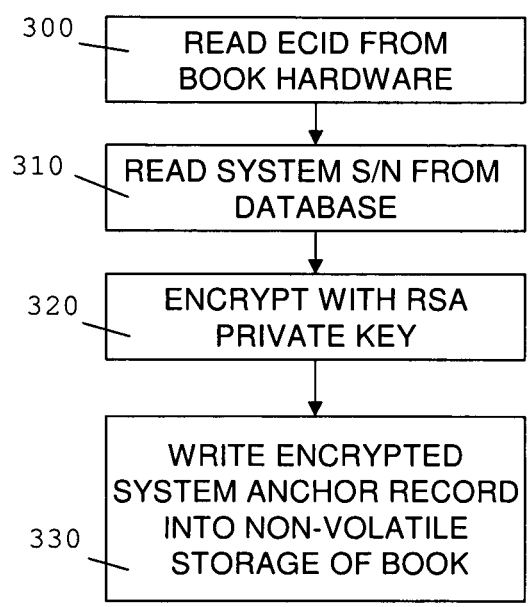
FIG. 3: Is a flow diagram illustrating a method for usage in computer system manufacturing.

The System Anchor Record 210 is built during manufacturing of the computer system. FIG. 3 illustrates this process. In step 300 an unchangeable identifier of some proprietary chip contained in a book of the computer system is read from the respective book hardware and used as the ECID 211. In step 310 the serial number of the computer system is retrieved from some manufacturing database and used as the system unique ID 212. The system serial number may or may not be encoded with the ECID 211 as suggested by U.S. Pat. No. 5,982,899. The resulting data reflecting the ECID 211 and the system unique ID 212 is encrypted with the private key utilizing RSA or another asymmetrical encryption algorithm in step 320. The encrypted data builds the System Anchor record 210, which is written in step 330 into a non-volatile storage of a book of the computer system.

The format of the System Anchor record 210 may be specific or a common record format may be used for the System Anchor Record 210 and for the Entitlement Records 220, 230, 240, 250 consisting of all elements needed for both types of records and utilizing only those elements needed for the respective record type. The entitlement records 220, 230, 240, 250 contain entitlements for exploitation of hardware capability and hardware capacity in the entitlement data 225, 235, 245, 255, e.g. the number and type of processors and the amount of memory available to the computer system user. The hardware capacity shipped may exceed the capacity purchased by the computer system user. For example, an entitlement record may be permanent as entitlement record 220, which means that its entitlements are permanent, or it may be temporary only as the entitlement records 230, 240, 250, which means that its entitlements are valid temporarily only.

Generation and Distribution of Entitlement Records

Figure 4:
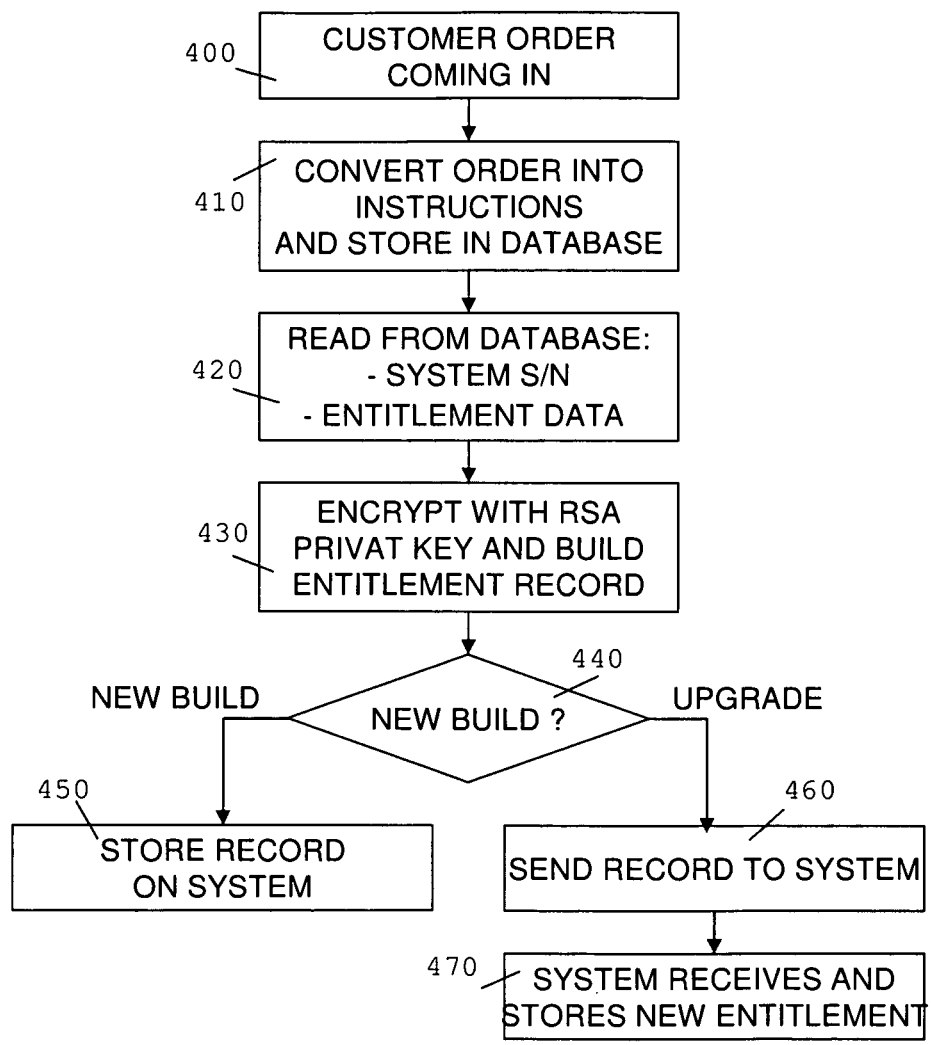
FIG. 4: Is a flow diagram illustrating a method to generate entitlement records.

FIG. 4 illustrates the generation and distribution of entitlement records. When the customer order for a computer system arrives at the manufacturer (step 400), then in step 410 the order data is converted into production and shipment instructions (e.g. processor capacity into required hardware capacity to be shipped and processor capacity to be enabled to exactly fulfill the order). The converted order data is then stored in a database. In case of an upgrade-order the computer system is already reflected in that database together with the system serial number. For a new order a system serial number may have to be assigned. From this database the system serial number and the entitlement data are retrieved in step 420 and then encrypted with the private key utilizing an asymmetric encryption algorithm like RSA in step 430. The resulting record from this process is called the Encrypted Entitlement Record. For new builds (step 440) the encrypted entitlement record is stored in some non-volatile storage of the new computer system in step 450. For upgrade orders the record is transferred in step 460 to the target computer system at the customer site where in step 470 the target computer system receives the data and stores it in some non-volatile storage. For example, the transfer can be performed via the Internet.

Processing of Entitlement Records

Figure 5:
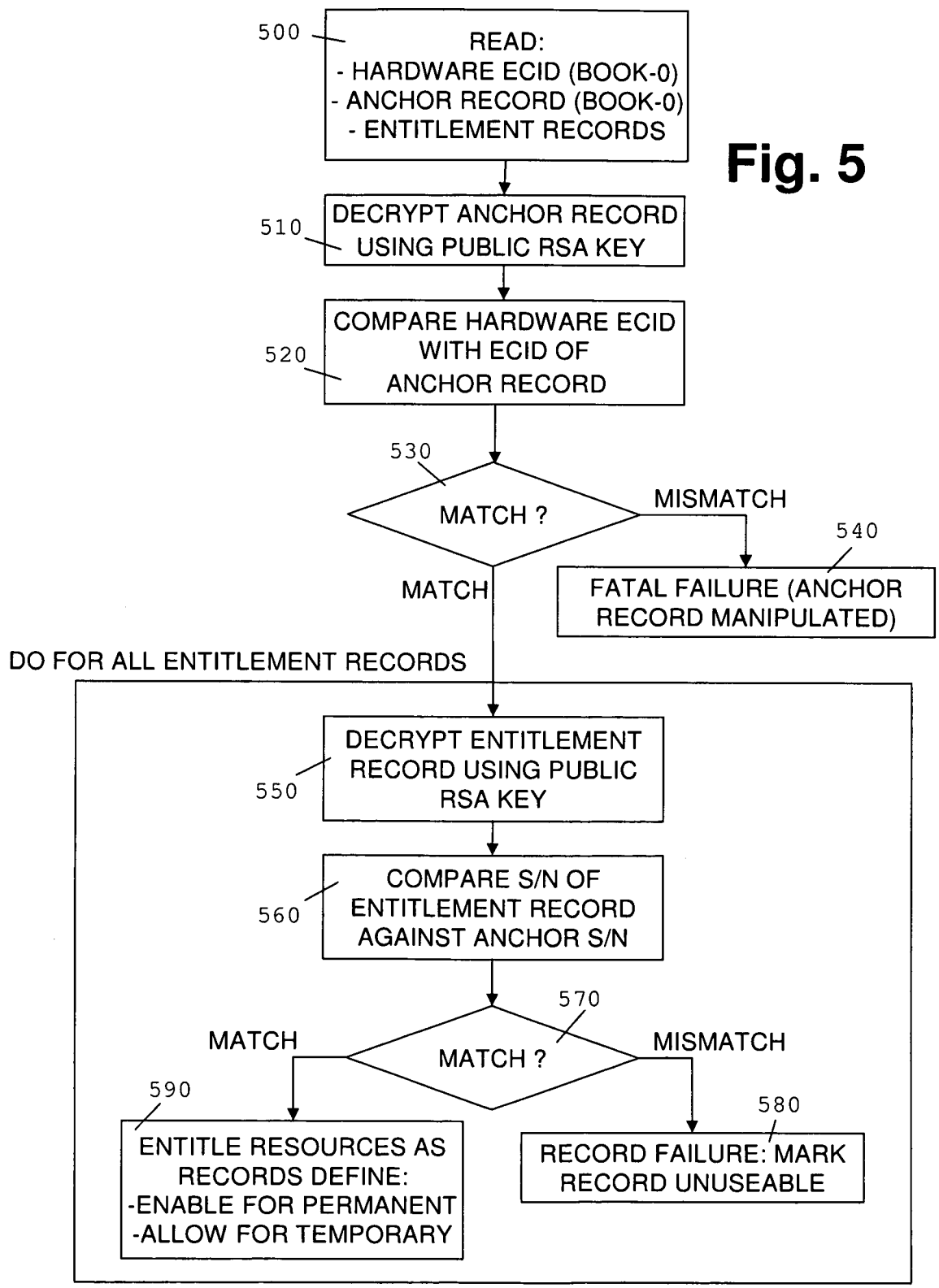
FIG. 5: Is a flow diagram illustrating a method for the verification of entitlement records.

Whenever the computer system initializes or when the customer or some automation tool decides to utilize temporary capacity the permanent and/or the temporary entitlement records need to be validated. It must be ensured that the entitlement records belong to the respective computer system. For validation the chain ECID-S/N-entitlement must be verified. The verification of the entitlements is illustrated in FIG. 5. In step 500 the computer system retrieves the hardware ECID directly from the hardware of processor book 150 and reads the anchor record from the non-volatile storage of processor book 150. Also the computer system reads all the entitlement records from the system non-volatile storage. In step 510 the computer system decrypts the anchor record and then verifies equivalence of the hardware ECID and the ECID stored in the anchor record in step 520. If a mismatch is found in step 530, this indicates manipulation and results in a fatal error in step 540. If a match is found in step 530 the correct system serial number is provided. Then the computer system continues with checking all entitlement records. In step 550 an entitlement record is decrypted using the public RSA key. Then in step 560 the entitlement record is checked by comparing the serial number (used as the system unique ID in the entitlement record) against the validated serial number of the anchor record. If a mismatch is found in step 570, then this indicates a manipulation of the entitlement record. Then the entitlement record is not accepted and marked 'unusable' in step 580. Only validated entitlement records will be accepted to enable system capacity in step 590.

Capacity entitled in permanent entitlement records is immediately enabled; capacity entitled in temporary entitlement records is made available to the customer for temporary upgrade whenever he decides to utilize this temporary capacity. The temporary upgrade and downgrade may be done manually or by automation to the extent as defined by the total of validated temporary entitlement records.

A simple embodiment only uses the non-volatile memory 155 of processor book 150 because the System Anchor record 210 only contains the value of ECID 110 as ECID 211. As long as processor book 150 stays in a configuration the other ECIDs 120, 130, 140 are not used. Whenever processor book 150 is replaced by a new processor book the ECID 110 is obsolete and needs to be replaced by the ECID of the new processor book as well as the System Anchor record 210 must be replaced by a new System Anchor record to reflect the new ECID.

Since the System Anchor record 210 refers to processor book 150 it is recommended to store the System Anchor record 210 in the non-volatile memory 155 of processor book 150 only. The entitlement records 220, 230, 240, 250 as system level configuration data, however, may not be stored in the non-volatile memories of the processor books but in some non-volatile system storage that is not exchanged as part of a processor book. An example is a hard disk storage of the computer system. This has the advantage that it is not required to transfer the entitlement records to the replacement hardware before the exchange. Another advantage is that is more difficult to clone the entitlement data and use it for a different computer system, for which it was not authorized by the manufacturer and/or seller of the computer system.

Instead of processor book 150 also one of the other processor books 160, 170, 180 could be used to store the system anchor record. But there is only one System Anchor record in use per computer system at the same time. For example, by defining an exchangeable component that is plugged in a dedicated slot of the computer system as the carrier of the System Anchor record, the management of the assignment of a System Anchor record to a particular computer system is simplified for the manufacturer and/or seller. With this convention, only the subset of the exchangeable components comprising System Anchor records needs to be tracked separately.

Instead of the ECID 110, also another unchangeable identifier stored in the computer system can be used. The advantage of using ECID 110 is that it is guaranteed that it is always available for the System Anchor record 210 in case the processor book 150 is not broken. Otherwise, if the unchangeable identifier is stored in a different component, the System Anchor record can be unusable when this component is broken. However, if an unchangeable identifier is used which is stored in a component which cannot be replaced, the problem solved by the temporary entitlement records would not exist. In that case, all entitlement records will be associated to the computer system directly as the unchangeable identifier is then always available unless the entire computer system is (at least temporarily) broken.

Temporary Capacity

In the preferred embodiments of the invention, the flexible temporary capacity upgrade/downgrade method and device for a computer system described in U.S. Pat. No. 7,194,616 are adapted accordingly. U.S. Pat. No. 7,194,616 introduces a so called Resource Controller that enables and disables processor capacity and other resources upon request. It enables the various resources up to a level as defined in Capacity Data Sets defining the maximum of permanent entitlements and the maximum of temporary entitlements. The entitlement records will be used as the Capacity Data Sets. The Capacity Data Sets are stored in a storage unit connected to a hardware console, which is part of the computer system.

This approach is not limited to protect resources of processor books. The entitlement records may include entitlements for I/O (input/output) adapters or other functions provided by the same computer system under the same system serial number, or separate entitlement records for such resources may be defined and linked to the System Anchor record.

The use of temporary capacity is under control of terms and conditions. Different types of temporary capacity with different terms and conditions for different purposes can be defined, e.g. one for backup capacity to be used for disaster recovery, or another one to be used for workload peaks. Appropriate use of temporary resources within the terms and conditions has to be enforced.

For example, for System z Capacity on Demand a set of temporary offerings is supported where each has its defined rules and limits, some of these rules and limits are specified in the order or in the billing system, some are hard coded in the System z firmware, and some are part of temporary entitlement records. However, each time a new offering type has to be introduced, the firmware needs to be changed because there are dedicated entitlement checking and backend processing paths for each offering type. Also some rules or terms and conditions even have to be enforced by manual intervention.

Figure 6:
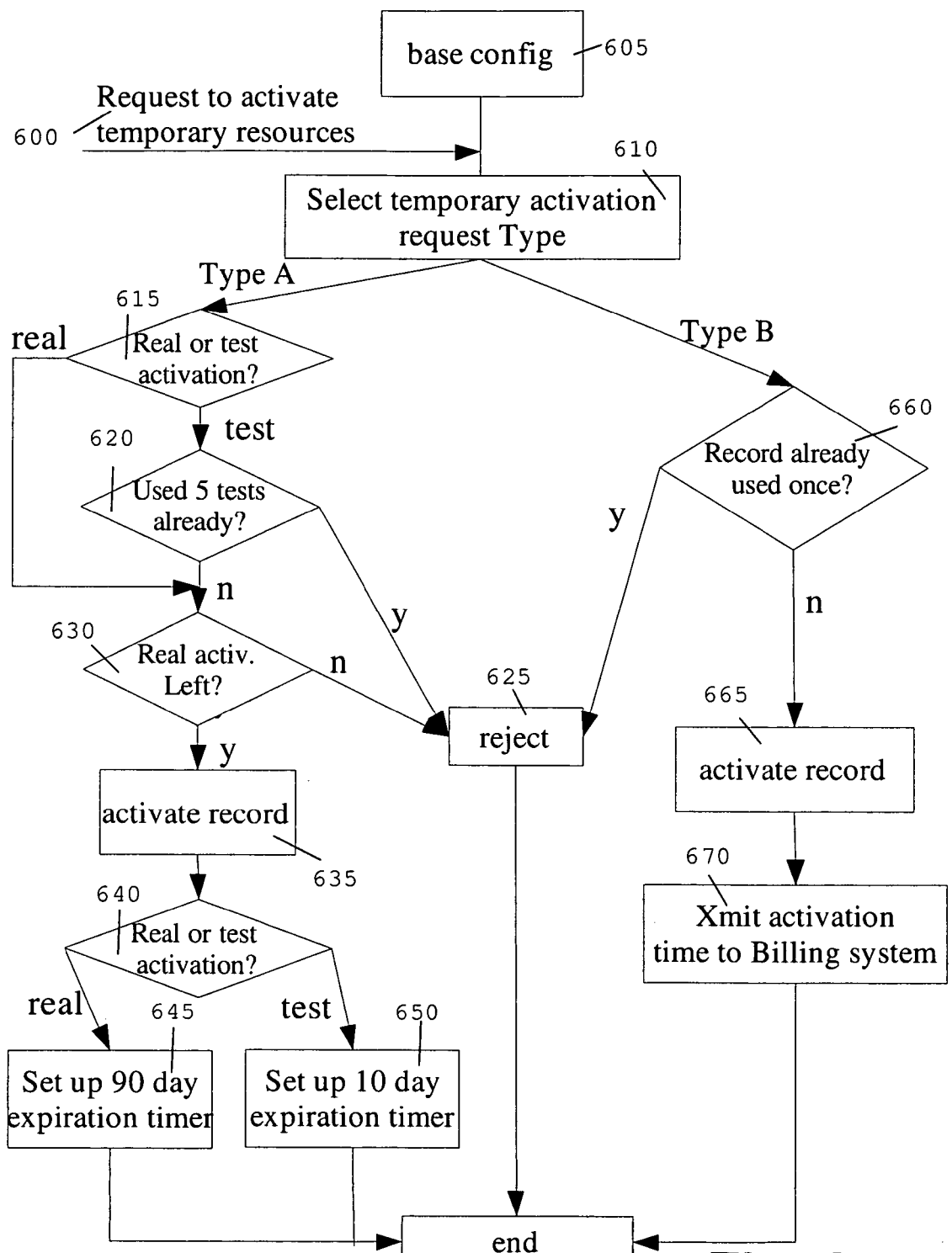
FIG. 6: Is a flow diagram illustrating a method to activate temporary capacity.

FIG. 6 shows how a request 600 to activate temporary capacity in addition to the base configuration 605 is handled by a System z computer system according to the state of the art. In step 610 the temporary activation request type is selected for the request 600 by the System z firmware. The following two example offerings are available at the computer system. Offering type A is an example for a pre-paid offering which can be activated at most 6 times, 5 of these for test purposes, one for a real activation, with a fixed expiration time of 10 days (for test) and 90 days (for real activation), respectively, which is controlled inside the machine. Offering type B is an example for a single use record for a post-paid offering, which requires the transmission of the activation time to the billing system outside of the machine. The type selection in step 610 will lead to the use of an entitlement record for the request 600.

For type A, the firmware will check in step 615 if the activation request is for test purposes or for a real activation. Then in step 620 it will check if the associated entitlement record was used already more than 5 times for test purposes already. If that is the case, then the request 600 will be rejected in step 625. Otherwise or in case the request 600 was for a real activation, the firmware will check if a real activation is left for the entitlement record in step 630. If not, then the request 600 will be rejected also in step 625. Otherwise, the entitlement record will be activated in step 635. As part of the actual activation, the firmware will check in step 640 whether this was a real or a test activation, and a timer will be established and started in steps 645 and 650, respectively, by the firmware. This timer will expire 10 or 90 days after the activation, respectively. Once the timer is expired, the temporary capacity associated to the entitlement record will be disabled by the firmware.

For type B, the firmware will check if the associated entitlement record was already used once in step 660. If that is the case, then the request 600 will be rejected in step 625. Otherwise the entitlement record will be activated in step 665. After the activation, the firmware will report the activation time to the billing system of the manufacturer and/or seller of the computer system in step 670. For example, such transmission can be performed using the Internet via a service processor and/or a hardware console of the computer system.

Generation of Temporary Entitlement Records

When a customer orders temporary capacity, the temporary capacity entitlement records are generated as described for the entitlement records above. For the preferred embodiment of the invention, the following input is needed for the generation of a temporary entitlement record:

the system serial number of the target system which is retrieved e.g. from an order system database, and the desired entitlement data.

The desired entitlement data consists of a set of rules and corresponding limit values for the respective temporary capacity offering.

The selection of rules and limit values can be either done by the customer himself by showing him the complete list of rules that are supported in the machine, and let him decide which ones he wants to apply and what his limiting values should be, or the computer system manufacturer or seller could offer some pre-canned, pre-defined offerings that already contain "best practices" rules and limits to simplify the ordering process for the customer.

For example, on a control panel of an entitlement record generator the following limiting values can be selected as desired, wherein the offering signature flags specify which rules/limits are in effect:

Temporary Entitlement Record Generator

| MachineSN: | 00000000000MNXK4 |
|---|---|
| UniqueRecordID | 06665801 |
| Offering: | Type 02 Flags 00001001 00100000 |

CPU Entitlement Definitions

| maxCPU# | n/a | CPU tokens | n/a |
|---|---|---|---|
| maxCP_FC | n/a | | |

-continued

| | | | |
|---|---|---|---|
| maxSpeedSteps | n/a | | |
| maxMSU % | 250 | MSUtokens | n/a |

Specialty Engine Entitlement Definitions

| | | | |
|---|---|---|---|
| maxSAP# | 6 | SAP tokens | n/a |
| maxICF# | 6 | ICF tokens | n/a |
| maxIFL# | 8 | IFL tokens | n/a |
| maxzAAP# | 8 | zAAP tokens | n/a |
| maxzIIP# | 8 | zIIP tokens | n/a |

Expiration Conditions and Time Limits

| | | | |
|---|---|---|---|
| ExpirationDate | Aug. 31, 2007 | TimeExpiryGrace | 2 |
| #RealActivations | 1 | #RealActivationDays | 90 |
| #TestActivations | 0 | #TestActivationDays | n/a |

In the example, a temporary entitlement record for the System z computer system with the serial number (MachineSN) 00000000000MNXK4 is created. The temporary entitlement record is given a unique record identifier by the entitlement record generator, which allows to uniquely identifying this particular temporary entitlement record. This record identifier can be overwritten by the user, e.g. for generating refill records. The Offering type and flags field is used to uniquely identify the offering type with respect to its terms and conditions and for billing purposes. For example, billing windows can be defined as 24-hour windows. Tokens according to IPCOM000139433D are decremented at the end of each billing window. The offering type can also be used e.g. to encode descriptive text to be displayed on the computer system panels.

This record comprises enablement data for a maximum of 6 SAPs (System Assist Processors) to be used by the System z Channel Subsystem (CSS), a maximum of 8 zAAPs (z Application Assist Processors) for Java processing in an operating system, a maximum of 8 IIPs (Integrated Information Processors), a maximum of 6 ICFs (Internal Coupling Facilities), and a maximum of 8 IFLs (Integrated Facilities for Linux). For example, "IBM eServer zSeries 890 Technical Introduction", IBM Redbook, published by IBM Corporation, publication number SG24-6310-00, First Edition (May 2004), provides details for such System z computer system configurations.

The entitlement for CPU usage (standard Central Processors) to be used by the operating systems can be limited by the maximum number of CPUs plus their maximum speed delta (sub-capacity speed setting) relative to the permanent configuration (maxSpeedSteps), a MSU percentage, or a number of CP feature codes. MSU, sub-capacity settings, and CP feature codes are described e.g. in sections 1.3 and 1.4 of the above mentioned publication. The CP feature codes are used to encode the number of additional temporary CPs plus the number of permanent CPs with their changing speed (independent how many speed steps are added). The MSU percentage specifies how much MSU capacity relative to the permanent configuration can be added using this record. In this example, the maximum number of CPUs (maxCPU#), the maximum number of CP feature codes (MaxCP_FC) and the number of speed steps is not used for limiting CPU capacity, and therefore marked as n/a (not applicable). The percentage of purchased MSUs that can be added using this temporary entitlement record is 250%. This means that 250% of the permanent MSUs are added, resulting in a total of 250%+100%=350% MSUs (permanent plus temporary MSUs).

The temporary entitlement record expires on Aug. 31, 2007 (ExpirationDate). No tokens will be used for any of the physical resources. The temporary entitlement record can be activated once (#RealActivations) for 90 days (#RealActivationDays). This temporary entitlement record cannot be activated for test purposes (#TestActivations), and so the duration for the test activation is not applicable (#TestActivationDays). The TimeExpiryGrace field specifies that 2 grace days are available before this temporary entitlement record is automatically deactivated after the expiration date or when the maximum number of activation days (90 in this example) is exceeded.

After processing the input data, the control panel will display the following signature data for the generated temporary entitlement record and also include this signature in the temporary entitlement record itself:

Offering Signature 10000000 10111100 00000000 00000000 00000000

The signature flags provide the actual entitlement data of the temporary entitlement record, which was generated by the control panel for the input data. The '1' bits in the signature correspond one to one with the rule set that can be selected when generating temporary entitlement records. For example, the bits corresponding to fields where the user has entered 'n/a' are 0, meaning this rule is not in effect for this temporary entitlement record. This also means the corresponding entitlement field is unlimited. This could be used e.g. for specifying that a temporary entitlement record can be activated an unlimited number of times—by entering 'n/a' in the #RealActivations field. Bits corresponding to fields where the user has entered entitlement limits are set to '1', telling the computer system that the corresponding rule needs to be verified and enforced.

In addition, the control panel can provide comments regarding the validity of the temporary entitlement records. In the above example, a warning could be provided to decrease the number of SAPs and other speciality engines in order to provide the required capacity for the CPs, given the physical machine configuration of machine SN 00000000000MNXK4.

Temporary Entitlement Records

According to the preferred embodiment of the invention, a new, flexible, version controlled certificate structure to control the temporary capacity will be used. An offering signature tells how to interpret this certificate structure. This certificate structure represents a set of rules that can be used in an offering in any combination, independent of each other. These rules are represented by control fields which can be grouped into resource limit fields (e.g. maximum number of processors or another representation of the processing capacity that can be added), time limit fields (e.g. expiration date or number of days a record can be active), and consumable token fields (e.g. processor day tokens or number of times this record can be activated). All temporary capacity entitlements are controlled via the same record structure.

A computer system according to the invention understands all these rules and therefore no changes to the firmware of the computer system are required when a new offering with a new combination of rules is defined. Not all rules are necessarily used for any given offering. The rules used for an offering can be defined by terms and conditions of the manufacturer or seller of the computer system, as well as by the customers desire to self-impose limits. If a certain rule is not in effect for an offering, this means this part of the offering is unlimited (used e.g. for specifying that a record can be activated an unlimited number of times).

Using this flexible certificate structure, new offerings can be easily generated by new combinations of existing rules, also without having to change the firmware of the computer system.

All the different control instances that are distributed across the computer system in the state of the art (e.g. number of activation days), order system (permanent to temporary capacity ratios), and back-end processing (expiration grace periods) can now be consolidated in one central control instance, that is, the temporary entitlement certificate. This means that a great number of Terms and Conditions of an offering are now directly and automatically controlled by the machine, rather than in the back-end processing and without relying on human audit.

New methods to limit the temporary capacity entitlement can be used according to the invention. Prior computer systems used fixed processor counts or capacity settings for the target configuration. The invention allows to specify a range of target configurations that is automatically adjusted when the permanent configuration changes.

For example, an entitlement limit is the IBM System z MSU (Millions of Service Units) percentage. By using a percentage of the permanent configuration value rather than a fixed number, the range of possible target configurations is automatically adjusted after changes in the permanent machine capacity. Another example is the number of CP feature codes. A CP feature code limits the number of processors and/or speed changes relative to the permanent configuration.

A version control is provided for the temporary entitlement records allowing adding new rules or changing the meaning of existing rules for future computer systems, if needed.

Figure 7:
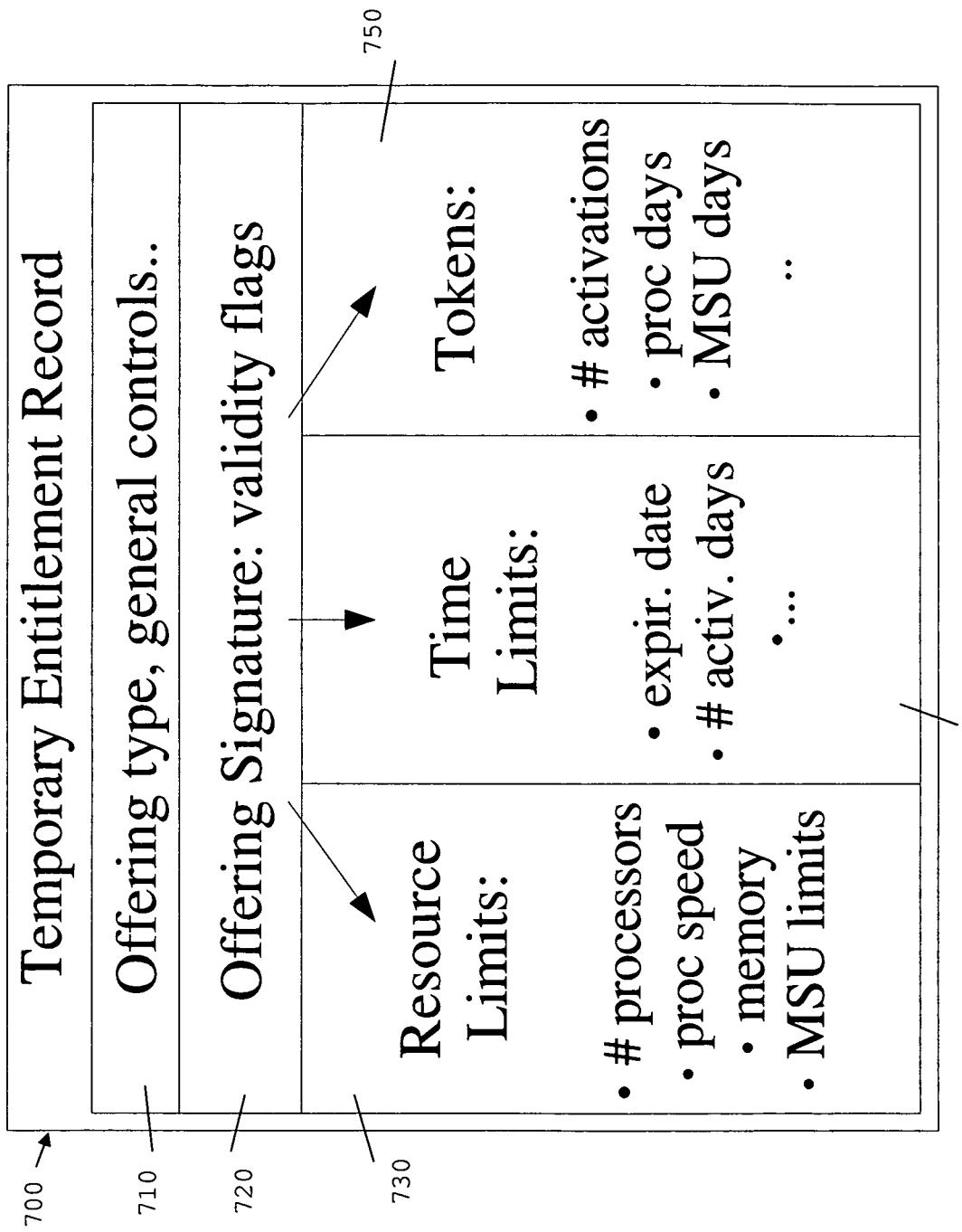
FIG. 7: Is a block diagram illustrating a temporary entitlement record in accordance with the invention.

FIG. 7 illustrates a temporary entitlement record 700 in accordance with the invention. The entitlement record 700 comprises a system serial number in a field 710, which contains data about the offering type and other general control information. The actual entitlement data of the temporary entitlement record 700 is contained in the offering signature 720. For example, the offering signature 720 is a 64 bit field containing flags indicating the validity of the entitlement data, the offering type and other offering flags. It further comprises a resource limit field 730, a time limits field 740, and a tokens field 750. The tokens field 750 is used to store tokens according to IPCOM000139433D. Especially, it stores data such as the number of activations for a temporary entitlement record, and usage dependent entitlements, e.g. the number of processing days and the number of MSU days. The time limits field 740 stores data such as the expiration date and the number of activation days. The resource limits field 730 stores data such as the number of processors, the MSU limits, and the speed of the processors and the amount of memory.

Activation of Temporary Capacity

Capacity from a temporary entitlement record can be activated either by manual action (via panels on a user console of the computer system) or via automation products that use application programming interfaces provided by the computer system. In both cases a data structure called activation level is received by the firmware of a computer system according to the invention. This activation level contains a record identifier for the temporary capacity entitlement record from which resources should be activated, and information about the number and type of resources or other types of computer system capacity that should be activated.

Figure 9:
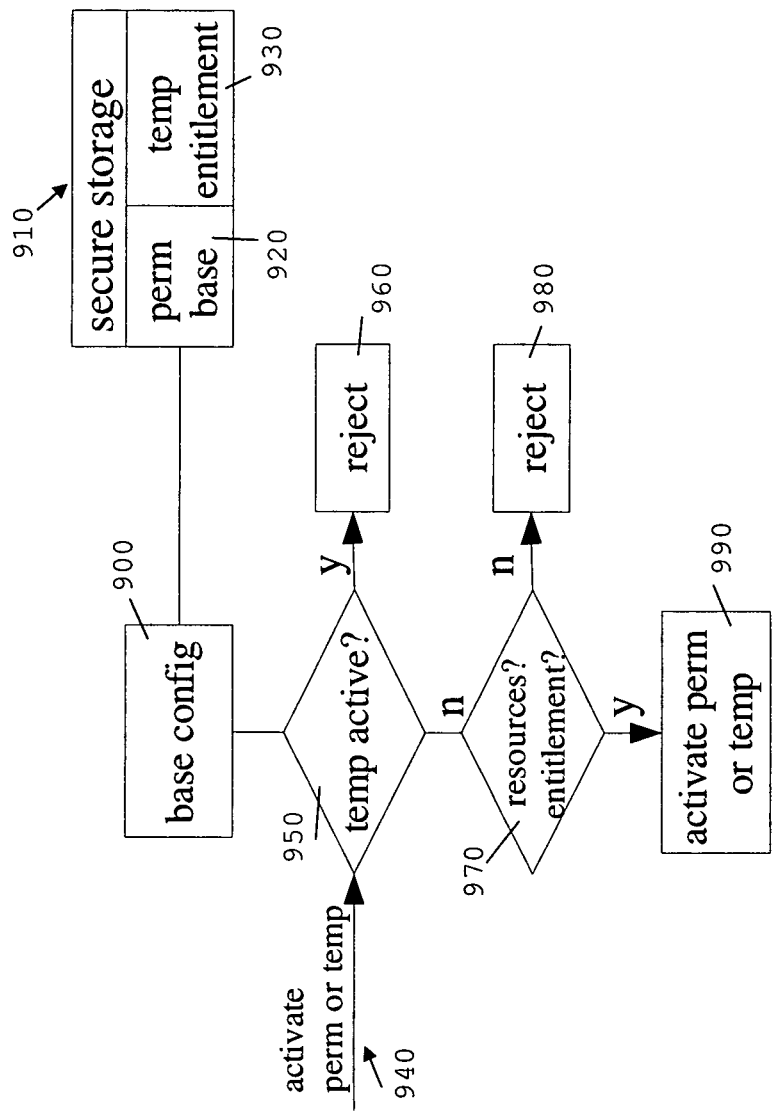
FIG. 9: Is a flow diagram illustrating a method to activate temporary capacity.

The firmware of the computer system acts as a secure mechanism to import and control the activation request as illustrated in FIG. 9. When the firmware receives an activation level 800, it first checks in step 805 whether the corresponding entitlement record can be found in the non-volatile storage of the computer system. If not, the request is rejected immediately in step 810. The matching of an activation level with its corresponding temporary entitlement record is achieved by its unique record identifier.

If a matching entitlement record can be found, the firmware proceeds with step 815. The firmware does not need to know what type of offering is being processed. It just loops through all rules in the record, and compares the request specified within the activation level with the entitlement limits in the temporary capacity entitlement record.

Figure 8:
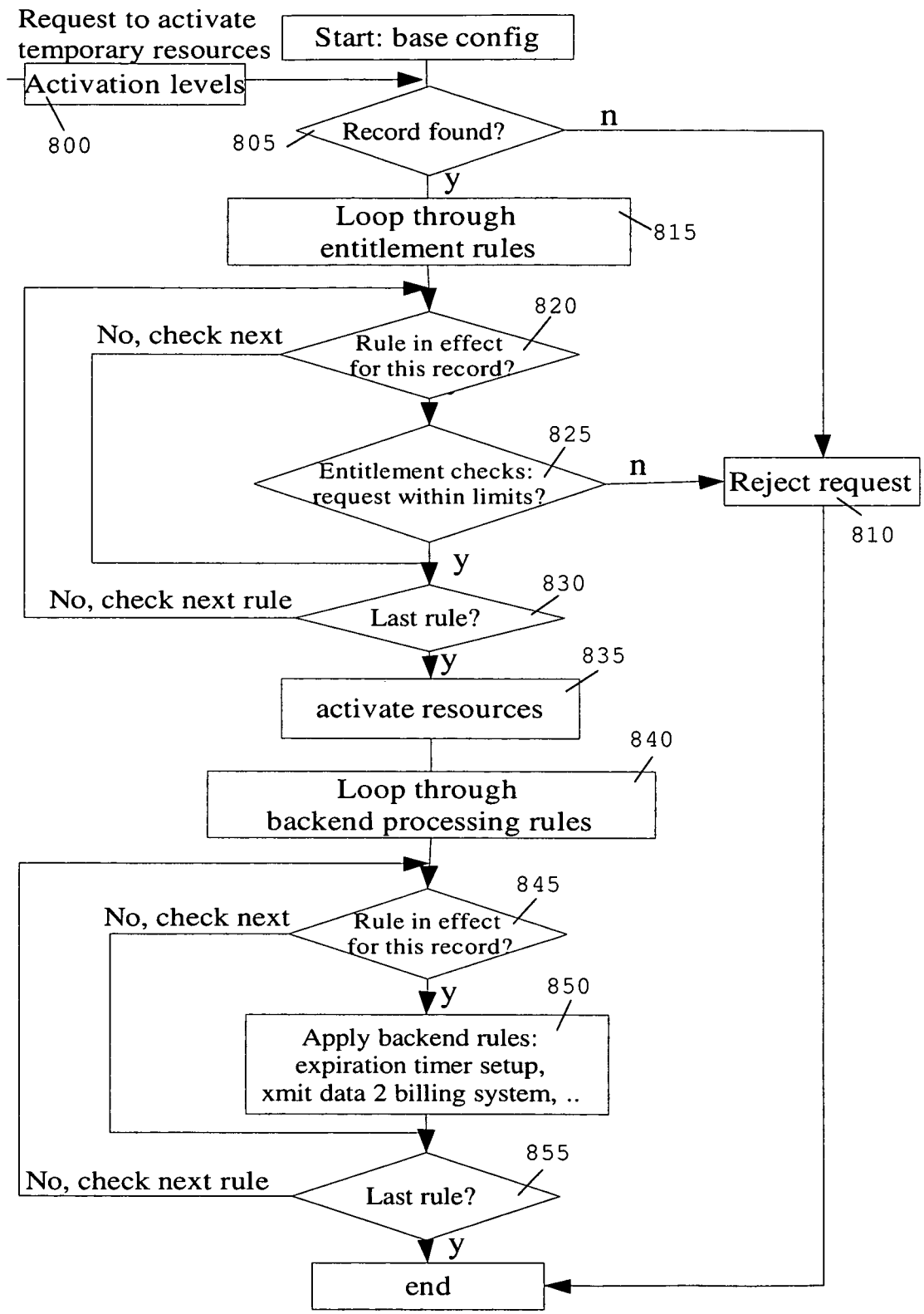
FIG. 8: Is a flow diagram illustrating a method to activate temporary capacity according to the invention.

The looping through all the rules in the temporary entitlement record is shown in more detail in FIG. 8. In step 820 it is determined, based on the offering signature, if the current rule is in effect for the temporary entitlement record. If not, the firmware continues with step 830. Otherwise, it is determined in step 825 if the request is within the allowed limits. Limiting factors could be record expiration conditions, maximum number of resources of a given type exceeded, or not enough tokens left in the token pools to satisfy this request. If any of the entitlement checks fails, the entire activation request is rejected in step 810. In step 830 the firmware determines now if all rules have been processed already. If not, the next rule will be processed in step 820.

If all entitlement checks have been passed, the requested resources are activated in step 835. After activation of these resources, the firmware loops through the rules again in step 840 and checks what back-end processes need to be started (e.g. decrement tokens in the entitlement record in non-volatile machine storage, setup timers to control expiration conditions, transmit certain data to the billing system, etc.). In step 845 the firmware determines again, if the current rule is in effect for the temporary entitlement record. If not, then the firmware continues with step 855. Otherwise, the firmware determines in step 850, which backend processed need to be started. Then in step 855 the firmware determines if all the rules have been processed for the entitlement record. If not, the next rule will be processed in step 845.

Multiple Temporary Capacity Offerings

As described above, permanent and temporary capacity is under control of entitlement records. As shown in FIG. 9 for a base configuration 900 of a computer system, the permanent entitlement record 920 and one temporary entitlement record 930 are stored in a secure storage 910. But different temporary entitlement records with different terms and conditions for different purposes could be defined, e.g. one for backup capacity to be used for disaster recovery, and another one to be used for workload peaks.

These temporary entitlement records are mutually exclusive, i.e. while a backup capacity record is active, no peak workload capacity can be activated, or vice versa. This dramatically restricts the way a customer can use his computer system as in the current System z computer systems only one temporary capacity record can be activated at a time. That is, when a computer system is used for regular production workload and also for reserve backup capacity, and temporary capacity is active to cover peak workloads, in a case of disaster of another computer system, there is no means to activate backup capacity without turning off the peak workload capacity first.

FIG. 9 illustrates the processing of a request 940 to activate permanent or temporary capacity by the firmware of the computer system according to the state of the art. In case a temporary entitlement record is already active (step 950), the request 940 is rejected in step 960. Otherwise it will be determined by the firmware in step 970 if sufficient resources are available to fulfill the request 940. If not, the request 940 will be rejected in step 980. Otherwise the permanent or temporary capacity will be activated in step 990 as requested by the request 940.

Figure 10:
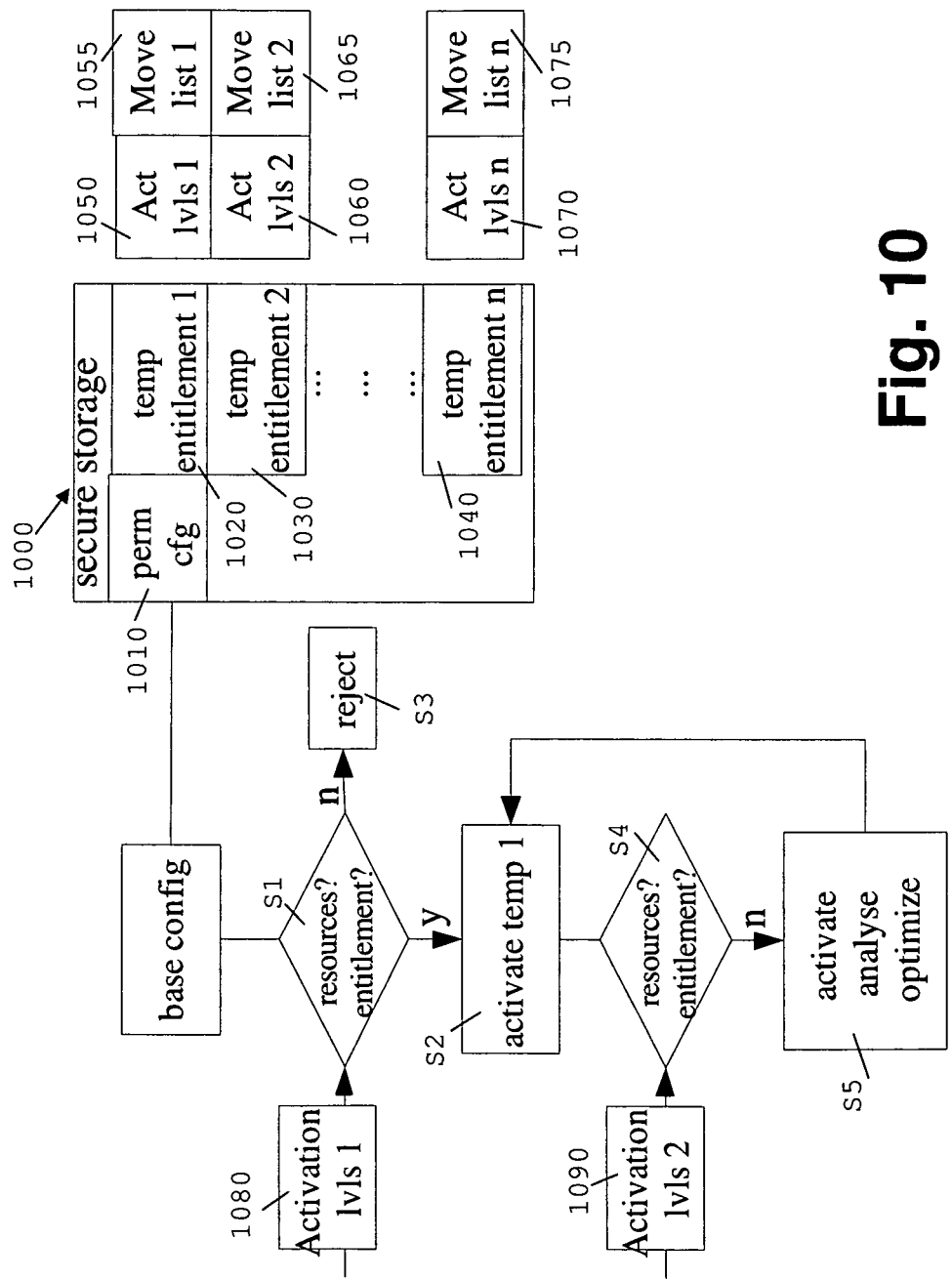
FIG. 10: Is a flow diagram illustrating a method to activate temporary capacity according to the invention.

FIG. 10 shows a flow diagram illustrating a method to activate temporary capacity according to the invention. A non-volatile secure storage 1000 of the computer system comprises the data 1010 for the permanent configuration of the computer system, and entitlement data 1020, 1030, and 1040 associated to the temporary capacity upgrades, which is derived from the temporary entitlement records.

Also, in order to assist the customer in selecting the activation possibilities, for the entitlement data 1020, 1030, 1040 and their associated activation levels 1050, 1060, 1070 there is an associated valid movement list 1055, 1065, 1075 that shows at any given time all activation possibilities for the associated entitlement data based on the record entitlement concerning resource limits, currently available spare resources in the computer system, and taking into account all other concurrently active entitlement records at this time.

The activation levels 1050, 1060, 1070 and the valid movement lists 1055, 1065, 1075 can be stored in secure storage as well, but this is not mandatory since they are not critical entitlement data that is vulnerable to modifications. The valid movement lists 1055, 1065, 1075 can be recalculated at any given time, and the activation levels 1050, 1060, 1070 can be restored via panel actions or system management automation.

When a temporary entitlement record is installed in the computer system as described above, its firmware calculates the initial list of valid movements for this entitlement record and stores it. This is done by looping through all activation variations for this entitlement record, first filtering out all the positions that are not reachable because of insufficient record entitlement, and then filtering out all the positions that are not reachable because the machine does not have enough spare resources to activate the desired position. Especially, it needs to be ensured that all temporary entitlement records can be activated and deactivated in any order, so that all movements that would leave another currently active temporary entitlement record in a state where it can not be deactivated any more have to be filtered and must not appear in the list of valid movements.

This list can be generated in a 2-step approach for example. First, the computer system firmware loops through all possible configurations (which are a combination of number of processors and sub-capacity settings) of the computer system model. It then determines which delta in terms of processors and speed needs to be applied to the permanent computer system configuration (not considering other currently active temporary entitlement records) to reach the target configuration. These delta values are then checked against the temporary entitlement record limits. Delta values that exceed the temporary entitlement record limits are filtered out of this list. In a second step, the remaining list of delta values are checked against the current computer system configuration including the activation levels of all other currently active temporary entitlement records, and it is checked if enough spare resources are available in the computer system to apply those delta values to the current computer system configuration, or if applying these delta values would either result in a non-existent computer system configuration (e.g., due to exceeding the maximum sub-capacity speed setting for a computer system) or if it would leave other temporary entitlement records in a position where they can not be deactivated any more. If any of these conditions is true, the corresponding delta values are filtered out of the list. The remaining list of delta values comprises the list of valid movements for a temporary entitlement record.

When the first entitlement record with the associated entitlement data 1020 gets activated, the firmware of the computer system receives an activation request command. This contains a requested activation level 1080 structure that describes the desired target configuration. In step S1 the firmware of the computer system searches for the corresponding temporary entitlement record, and first checks that the request does not exceed the entitlement data of the temporary entitlement record. Then it checks whether enough spare resources are available to satisfy the request.

If all checks passed, the requested resources are activated in step S2, and the activation levels 1050 in the storage of the computer system is updated for this entitlement record. Then, the valid movement list 1055 is recalculated. Otherwise, the activation request is rejected in step S3.

When a second activation request and its activation level 1090 for another entitlement record with the associated entitlement data 1030 is received by the firmware, then in step S4 the firmware first checks again for the proper entitlement. Then it checks for available resources, and in step S5 it performs the actual activation. When the request was successful, it further checks in step S5 whether resources should be redistributed between the activation levels for the first and the second entitlement record. After the redistribution, the firmware writes the adjusted activation level 1060 for the changed record back into storage of the computer system. Also, the valid movement list 1065 is recalculated to reflect the current configuration of the computer system.

The same adjustment of activation levels and valid movement lists is performed for permanent model changes as well as for deactivations, for example to pick up pending resources for forced activation requests as described above. Also after activation, secure billing data is generated according to the rules in the entitlement record and sent to the billing system.

The described techniques may be implemented as a method, apparatus or article of manufacture involving software, firmware, micro-code, hardware and/or any combination thereof. The term "article of manufacture" as used herein refers to code or logic implemented in a medium, where such medium may comprise hardware logic [e.g., an integrated circuit chip, Programmable Gate Array (PGA), Application Specific Integrated Circuit (ASIC), etc.] or a computer readable medium, such as magnetic storage medium (e.g., hard disk drives, floppy disks, tape, etc.), optical storage (CD-ROMs, optical disks, etc.), volatile and non-volatile memory devices [e.g., Electrically Erasable Programmable Read Only Memory (EEPROM), Read Only Memory (ROM), Programmable Read Only Memory (PROM), Random Access Memory (RAM), Dynamic Random Access Memory (DRAM), Static Random Access Memory (SRAM), flash, firmware, programmable logic, etc.]. Code in the computer readable medium is accessed and executed by a processor. Additionally, the "article of manufacture" may comprise a combination of hardware and software components in which the code is embodied, processed, and executed. Of course, those skilled in the art will recognize that many modifications may be made without departing from the scope of embodiments, and that the article of manufacture may comprise any information bearing medium. For example, the article of manufacture comprises a storage medium having stored therein instructions that when executed by a machine results in operations being performed.

Certain embodiments can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, certain embodiments can take the form of a computer program product accessible from a computer usable or computer readable storage medium providing program code for use by or in connection with a computer or any instruction execution system. For the purposes of this description, a computer usable or computer readable storage medium can be any apparatus that can contain or store the program for use by or in connection with the instruction execution system, apparatus, or device. The storage medium can be an electronic, magnetic, optical, electromagnetic, infrared, or semiconductor system (or apparatus or device). Examples of a computer-readable storage medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

The terms "certain embodiments", "an embodiment", "embodiment", "embodiments", "the embodiment", "the embodiments", "one or more embodiments", "some embodiments", and "one embodiment" mean one or more (but not all) embodiments unless expressly specified otherwise. The terms "including", "comprising", "having" and variations thereof mean "including but not limited to", unless expressly specified otherwise. The enumerated listing of items does not imply that any or all of the items are mutually exclusive, unless expressly specified otherwise. The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries. Additionally, a description of an embodiment with several components in communication with each other does not imply that all such components are required. On the contrary a variety of optional components are described to illustrate the wide variety of possible embodiments.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously, in parallel, or concurrently.

When a single device or article is described herein, it will be apparent that more than one device/article (whether or not they cooperate) may be used in place of a single device/article. Similarly, where more than one device or article is described herein (whether or not they cooperate), it will be apparent that a single device/article may be used in place of the more than one device or article. The functionality and/or the features of a device may be alternatively embodied by one or more other devices which are not explicitly described as having such functionality/features. Thus, other embodiments need not include the device itself.

Figure 11:
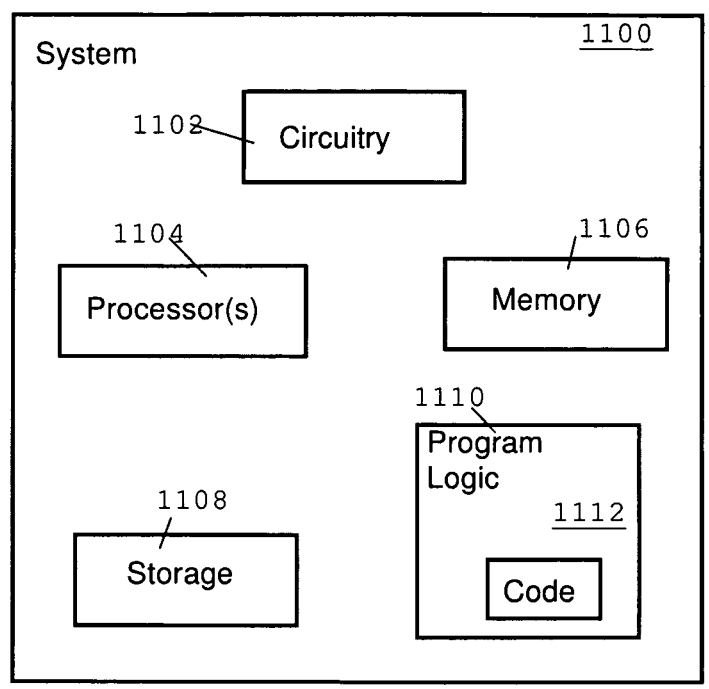
FIG. 11: Is a block diagram of a system in which certain embodiments may be implemented.

FIG. 11 illustrates a block diagram of a computer system 1100 in which certain embodiments may be implemented. The system 1100 may include a circuitry 1102 that may in certain embodiments include a microprocessor 1104. The computer system 1100 may also include a memory 1106 (e.g., a volatile memory device), and storage 1108. The storage 1108 may include a non-volatile memory device (e.g., EEPROM, ROM, PROM, RAM, DRAM, SRAM, flash, firmware, programmable logic, etc.), magnetic disk drive, optical disk drive, tape drive, etc. The storage 1108 may comprise an internal storage device, an attached storage device and/or a network accessible storage device. The system 1100 may include a program logic 1110 including code 1112 that may be loaded into the memory 1106 and executed by the microprocessor 1104 or circuitry 1102. In certain embodiments, the program logic 1110 including code 1112 may be stored in the storage 1108. In certain other embodiments, the program logic 1110 may be implemented in the circuitry 1102. Therefore, while FIG. 9 shows the program logic 1110 separately from the other elements, the program logic 1110 may be implemented in the memory 1106 and/or the circuitry 1102.

Certain embodiments may be directed to a method for deploying computing instruction by a person or automated processing integrating computer-readable code into a computing system, wherein the code in combination with the computing system is enabled to perform the operations of the described embodiments.

At least certain of the operations illustrated in the figures may be performed in parallel as well as sequentially. In alternative embodiments, certain of the operations may be performed in a different order, modified or removed.

Furthermore, many of the software and hardware components have been described in separate modules for purposes of illustration. Such components may be integrated into a fewer number of components or divided into a larger number of components. Additionally, certain operations described as performed by a specific component may be performed by other components.

The data structures and components shown or referred to in the figures and the description are described as having specific types of information. In alternative embodiments, the data structures and components may be structured differently and have fewer, more or different fields or different functions than those shown or referred to in the figures.

Therefore, the foregoing description of the embodiments has been presented for the purposes of illustration and description. It is not intended to be exhaustive or to limit the embodiments to the precise form disclosed. Many modifications and variations are possible in light of the above teaching.

The invention claimed is:

1. A method for configuring functional capabilities in a data processing system comprising non-volatile storage for configuration data, said configuration data comprising permanent entitlement data specifying permanent functional capabilities of said data processing system and temporary entitlement data specifying temporary functional capabilities of said data processing system, wherein said temporary entitlement data is generated from temporary entitlement records received by said data processing system, the method comprising the steps of:

a) when storing temporary entitlement data in said non-volatile storage, generating an activation level record specifying a number of resources of said data processing system used for temporarily implementing functional capabilities according to the temporary entitlement data and storing the activation level record in said non-volatile storage; and b) when receiving a request to activate or deactivate temporary capacity for said data processing system, for every activation level record:
activating the resources as specified by the activation level records.

2. The method of claim 1, wherein step b) comprises, for every activation level record:
b1) modifying the number of resources specified by the activation level records such that the overall sum of resources specified by the activation level records does not change; and
b2) activating the resources as specified by the activation level records.

3. The method of claim 2, wherein the step b1) further comprises the steps of:
b1a) determining if sufficient free resources are available to satisfy the specified number of resources in the activation level record; and
b1b) if not enough free resources are available, compensating this by reducing the number of resources of activation level records.

4. The method of claim 2, further comprising the steps of:
c) when receiving a request to deactivate temporary capacity for said data processing system, for every activation level record:
c1) modifying the number of resources specified by all activation level records such that the overall sum of resources specified by all activation level records does not change; and
c2) activating all resources as specified by all activation level records.

5. The method of claim 2, wherein in step a) also a valid movements list is generated and stored in said non-volatile storage, said valid movements list specifying all activation possibilities for the associated temporary entitlement data, and wherein said valid movements list is updated in step b1).

6. The method of claim 2, wherein in step b2) all available resources are activated, even when not enough resources are available as specified by all activation level records.

7. The method of claim 3, further comprising the steps of:
c) when receiving a request to deactivate temporary capacity for said data processing system, for every activation level record:
c1) modifying the number of resources specified by all activation level records such that the overall sum of resources specified by all activation level records does not change; and
c2) activating all resources as specified by all activation level records.

8. The method of claim 7, wherein in at least one of the steps b1), b1a), c1) the accounting charges for the temporary capacity are minimized.

9. The method of claim 7, wherein in at least one of the steps b1), b1a), c1) at least one of the following parameters of said data processing system is used to determine modifications in the numbers of resources: power consumption, temperature, and workload.

10. The method of claim 1, further comprising the step of:
converting temporary entitlement data into permanent entitlement data.

11. The method of claim 1, further comprising the step of:
responsive to receiving a permanent entitlement record, modifying the permanent entitlement data.

12. The method of claim 1, further comprising the step of:
increasing resource limits such as time limits for active temporary capacity.

13. The method of claim 1, wherein said configuration data is stored in a first non-volatile storage and said activation level records are stored in a second non-volatile storage.

14. A computer program product comprising a non-transitory tangible computer usable storage medium storing program instructions executable by a computer, the stored program instructions comprising a computer program loadable into an internal memory of a digital computer system, the computer program comprising software code portions for performing a method for configuring functional capabilities in a data processing system comprising non-volatile storage for configuration data when said computer program is run on said computer system, said configuration data comprising permanent entitlement data specifying permanent functional capabilities of said data processing system and temporary entitlement data specifying temporary functional capabilities of said data processing system, wherein said temporary entitlement data is generated from temporary entitlement records received by said data processing system, the method comprising the steps of:
a) when storing temporary entitlement data in said first non-volatile storage, generating an activation level record specifying a number of resources of said data processing system used for temporarily implementing functional capabilities according to the temporary entitlement data and storing the activation level record in said non-volatile storage; and
b) when receiving a request to activate or deactivate temporary capacity for said data processing system, for every activation level record:
activating the resources as specified by the activation level records.

15. The computer program product of claim 14, wherein said configuration data is stored in a first non-volatile storage and said activation level records are stored in a second non-volatile storage.

16. The computer program product of claim 14, wherein step b) comprises, for every activation level record:
b1) modifying the number of resources specified by the activation level records such that the overall sum of resources specified by the activation level records does not change; and
b2) activating the resources as specified by the activation level records.

17. A device for configuring functional capabilities in a data processing system comprising non-volatile storage for configuration data, said configuration data comprising permanent entitlement data specifying permanent functional capabilities of said data processing system and temporary entitlement data specifying temporary functional capabilities of said data processing system, wherein said temporary entitlement data is generated from temporary entitlement records received by said data processing system, the device comprising:
generation means responsive to means storing temporary entitlement data in said non-volatile storage, said generation means generating an activation level record specifying a number of resources of said data processing system used for temporarily implementing functional capabilities according to the temporary entitlement data and storing the activation level record in said non-volatile storage; and
selection means responsive to receiving a request to activate or deactivate temporary capacity for said data processing system, said selection means using for every activation level record:

activation means activating the resources as specified by the activation level records.

18. A data processing system comprising a device according to claim 17.

19. The device of claim 17, wherein said configuration data is stored in a first non-volatile storage and said activation level records are stored in a second non-volatile storage.

20. The device of claim 17, wherein said selection means uses, for every activation level record, modification means modifying the number of resources specified by the activation level records such that the overall sum of resources specified by the activation level records does not change, and wherein said activation means is responsive to said modification means.

* * * * *